United States Patent
Flaucher

(10) Patent No.: US 9,962,796 B2
(45) Date of Patent: May 8, 2018

(54) PIPE LOCATING SYSTEM

(71) Applicant: Data Point Targets LLC, Eagle Creek, OR (US)

(72) Inventor: Toby Flaucher, Eagle Creek, OR (US)

(73) Assignee: Data Point Targets LLC, Eagle Creek, OR (US)

( * ) Notice: Subject to any disclaimer, the term of this patent is extended or adjusted under 35 U.S.C. 154(b) by 92 days.

(21) Appl. No.: 15/192,886

(22) Filed: Jun. 24, 2016

(65) Prior Publication Data

US 2016/0377421 A1   Dec. 29, 2016

Related U.S. Application Data

(60) Provisional application No. 62/185,484, filed on Jun. 26, 2015.

(51) Int. Cl.
| | |
|---|---|
| *G01B 11/26* | (2006.01) |
| *B23K 37/04* | (2006.01) |
| *B23K 37/053* | (2006.01) |
| *B29C 65/78* | (2006.01) |
| *G01B 11/00* | (2006.01) |
| *G01C 15/00* | (2006.01) |

(52) U.S. Cl.
CPC ...... *B23K 37/0531* (2013.01); *B29C 65/7802* (2013.01); *G01B 11/002* (2013.01); *G01C 15/002* (2013.01)

(58) Field of Classification Search
CPC ......... G01B 11/26; G01B 11/272; G01S 7/48; G01S 7/481; G01S 17/88; G01S 17/66; G01S 17/74; B21D 37/12; B21J 13/02; B23P 15/24; B21K 25/00; Y10T 83/2159; E03B 7/00; E03F 3/06; E03F 7/12; B23K 37/0531; B29C 65/7802; G01C 15/002
See application file for complete search history.

(56) References Cited

U.S. PATENT DOCUMENTS

| | | | |
|---|---|---|---|
| 1,660,833 A | 2/1928 | Cronjaeger | |
| 2,166,650 A | 7/1939 | Townsend | |
| 4,100,809 A * | 7/1978 | Bobrov | ..................... B06B 1/04 |
| | | | 73/609 |
| 4,796,362 A | 1/1989 | Shoemaker | |
| 4,926,563 A | 5/1990 | Smith | |
| 5,461,793 A | 10/1995 | Melville | |
| 5,841,527 A | 11/1998 | Shibuya et al. | |
| 6,009,756 A * | 1/2000 | Willems | ............... G01N 27/902 |
| | | | 73/592 |

(Continued)

*Primary Examiner* — Sang Nguyen
(74) *Attorney, Agent, or Firm* — Klarquist Sparkman, LLP

(57) ABSTRACT

A method and device for location of pipes is disclosed. The method can comprise mounting one or more centering tools, each having a reflector to a first pipe such that the reflectors are either aligned with, or can be used to determine the location of the center of the first pipe and mounting one or more centering tools, each having a reflector to a second pipe such that the reflectors are either aligned with, or can be used to determine the location of the center of the second pipe. The method can further comprise determining a first distance between the center of the first pipe and a light emitting source at an observation point disposed between the first pipe and the second pipe and determining a second distance between the center of the second pipe and the light emitting source at the observation point.

6 Claims, 15 Drawing Sheets

(56) References Cited

U.S. PATENT DOCUMENTS

| | | | |
|---|---|---|---|
| 6,393,708 B1 | 5/2002 | Culver | |
| 6,823,600 B1 | 11/2004 | Vaughan | |
| 7,162,808 B2 | 1/2007 | Martin | |
| 7,370,431 B2 | 5/2008 | Sowder | |
| 8,616,038 B2* | 12/2013 | Breen | B21D 37/12 |
| | | | 72/350 |
| 8,713,811 B2* | 5/2014 | Carrell | B25H 7/005 |
| | | | 33/529 |
| 8,714,744 B2* | 5/2014 | Greaves | F16M 11/123 |
| | | | 348/373 |
| 8,803,055 B2 | 8/2014 | Lau | |
| 9,586,295 B2* | 3/2017 | Greenawalt | B23K 37/0452 |
| 2011/0079584 A1* | 4/2011 | Hees | E21B 19/16 |
| | | | 219/61 |
| 2013/0047770 A1* | 2/2013 | Iida | G01D 5/268 |
| | | | 74/490.01 |
| 2014/0163664 A1* | 6/2014 | Goldsmith | A61B 17/00491 |
| | | | 623/1.11 |

* cited by examiner

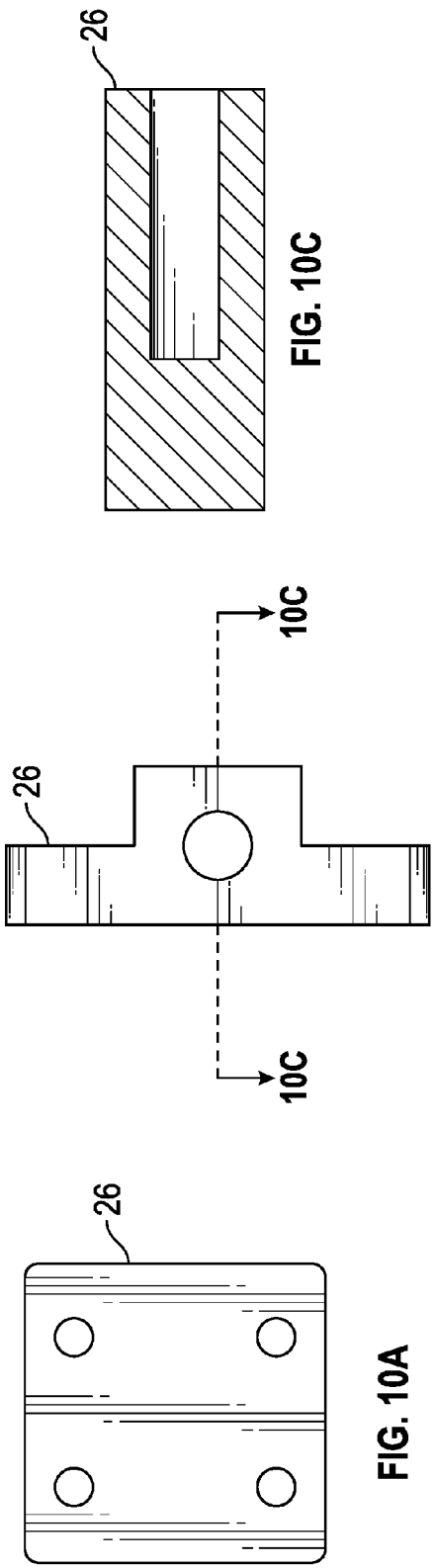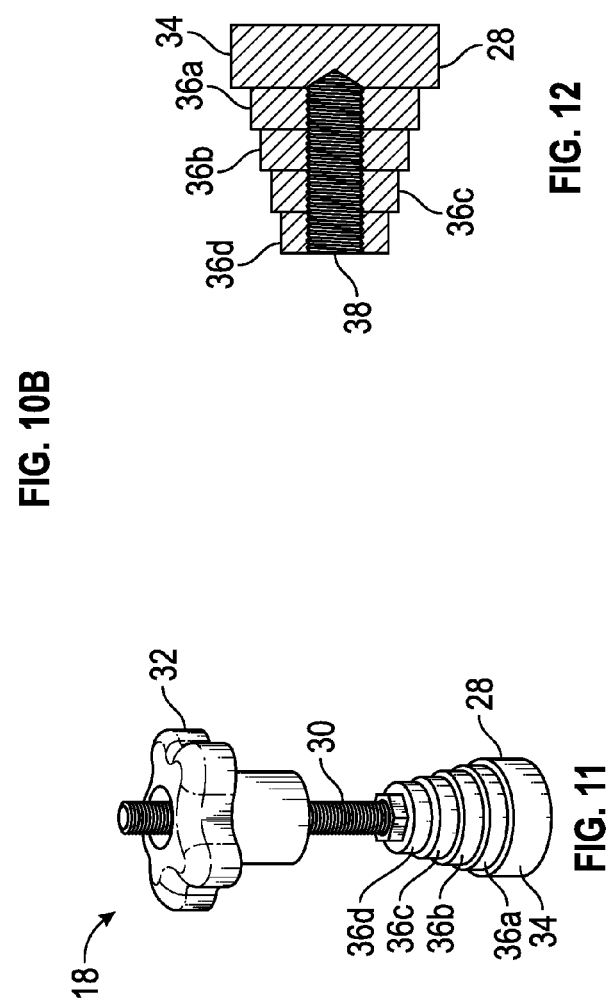

PIPE LOCATING SYSTEM

CROSS REFERENCE TO RELATED APPLICATION

This application claims the benefit of U.S. Provisional Patent Application No. 62/185,484, filed Jun. 26, 2015, which is incorporated herein by reference.

FIELD

The present disclosure relates generally to a method and device for locating a pipe. In particular, the present disclosure relates to a method and device for using a self-centering tool or assembly that mounts a laser target at the center of a pipe flange, and/or is configured to be mounted on the flanges of different size pipes, to determine the locations of the pipe flanges.

BACKGROUND

A considerable amount of effort is required for the correct placement, fabrication, and installation of pipes that convey liquid, gas, and occasionally solid materials. It is important that the location of pipes within an area be determined accurately so that a contractor can use this information to correctly cut and install additional pipes that extend between the pipes. Inaccurate measurements can lead to waste of time, materials, manpower, and a higher cost.

SUMMARY

This disclosure pertains generally to devices and related methods for locating pipes. In one embodiment, the method can comprise mounting a centering tool or assembly having one or more reflectors to a first pipe such that the reflector is either aligned with or can be used to determine the location of the center of the first pipe and mounting a centering tool or assembly having one or more reflectors to a second pipe such that the reflector is aligned with or can be used to determine the location of the center of the second pipe. The method can further comprise determining the distance between the reflector(s) mounted to the first pipe and a light emitting source at an observation point, which can be at a location between the first pipe and the second pipe, and determining the distance between the reflector(s) mounted to the second pipe and the light emitting source at the observation point. The method can further comprise determining the location of the center of first pipe relative to the center of the second pipe using at least these calculated distances. In some embodiments, the centering tool or assembly is removed from the first pipe and mounted on the second pipe after the first distance(s) is/are determined. In other embodiments, separate centering tools can be mounted on the first and second pipes.

In another embodiment, a method comprises mounting one or more target devices having one or more respective reflectors to a first pipe such that the one or more reflectors are either aligned with the center of the first pipe, or are equidistant from the center of the pipe; mounting one or more target devices having one or more respective reflectors to a second pipe such that the one or more reflectors are either aligned with the center of the second pipe, or are equidistant from the center of the pipe; determining a distance between each of the one or more reflectors mounted to the first pipe and a light emitting source at an observation point between the first pipe and the second pipe; determining a distance between each of the one or more reflectors mounted to the second pipe and the light emitting source at the observation point; and determining the location of the center of the first pipe and the location of the center of the second pipe from the determined distances.

In another embodiment, a centering tool can comprise a bracket member for removable attachment to at least a first pipe having a first diameter and a second pipe having a second diameter, the second diameter being less than the first diameter, a reflector rotatably disposed on the bracket member, the reflector rotatable along a first axis and a second axis, and at least two fasteners for removable attachment of the bracket member to one of the first pipe and the second pipe. The bracket member can have a length that is greater than the first diameter. The reflector can be disposed centrally on the bracket member.

In some embodiments of the centering tool, the bracket member can include at least a first set of openings for removable attachment of the bracket member to a first flange of the first pipe, and a second set of openings for removable attachment of the bracket member to a second flange of the second pipe, each set of openings including at least two openings disposed on opposing sides of the bracket member. The reflector can be centrally disposed with respect to the at least two openings of the first set of openings and the second set of openings. Additionally and/or alternately, the reflector can be disposed between an edge of the bracket member and one of the at least two openings of the first set of openings. Each of the fasteners can include a head that is tapered from a base end to a shaft end in a stepped manner for removable attachment to both the first pipe flange and the second pipe flange.

Some embodiments of the centering tool can include two elongate slots extending at least a portion of the length of the bracket member on either side of a central area of the bracket member. The reflector can be centrally located with respect to the ends of the elongate slots. The fasteners can each include an abutment piece configured to abut the outside convex surface of the first and second pipes.

In another embodiment, a target device comprises a bracket member configured to be removably attached to at least a first pipe having a first diameter and a second pipe having a second diameter, the second diameter being less than the first diameter. The target device can further comprise a reflector coupled to the bracket member at a location such that when the bracket member is mounted on either of the first and second pipes, the reflector is aligned with the center of the pipe, and at least two fasteners configured to attach the bracket to either of the first pipe and the second pipe.

In another embodiment, an assembly may comprise multiple target devices configured for removable attachment to various locations on a pipe flange of at least a first pipe having a first diameter and a second pipe having a second diameter less than the first diameter. These target devices may include a bracket member configured to be positioned on one side of the pipe flange of the first or second pipes, a reflector coupled to the bracket member, a clamping member configured to be positioned on an opposite side of the pipe flange from the bracket member, an abutment member positioned between the bracket member and the clamping member and configured to contact an outer side surface of the pipe flange, and a fastener configured to retain the bracket member and the clamping member on opposite sides of the pipe flange. The bracket member may also include levels that can be used to determine the proper position of the target device. The assembly may further include a fastener that extends through the bracket member, abutment member and clamping member which, when tightened, clamps the bracket member and clamping member on opposite sides of the pipe flange. The assembly may further include alignment pins for aligning the bracket member with the clamping member and the abutment member. The abutment member may further include a concave surface shaped to correspond with and seat against the outer surface of the pipe flange.

The foregoing and other objects, features, and advantages of the invention will become more apparent from the following detailed description, which proceeds with reference to the accompanying figures.

BRIEF DESCRIPTION OF THE DRAWINGS

FIGS. 10a-c show various views of a reflector gimbal member of a reflector gimbal.

FIG. 11 is a perspective view of an assembled fastener.

FIG. 12 is a cross-sectional side view of a fastener head.

DETAILED DESCRIPTION

The present disclosure describes a pipe locating system that is suitable to accurately determine the location of one or more pipes in an area. The pipe locating system can be used in an indoor or outdoor setting. The pipe locating system can include a laser surveying device at an observation point in an area and a plurality of target devices, also referred to as centering tools in some embodiments, removably mounted to pipes in the area such that the laser surveying device can determine the location of the plurality of targets without moving the laser surveying device from the observation area. The laser surveying device can also be referred to as a theodolite and/or a total station and can include any device that emits a light.

Figure 1:
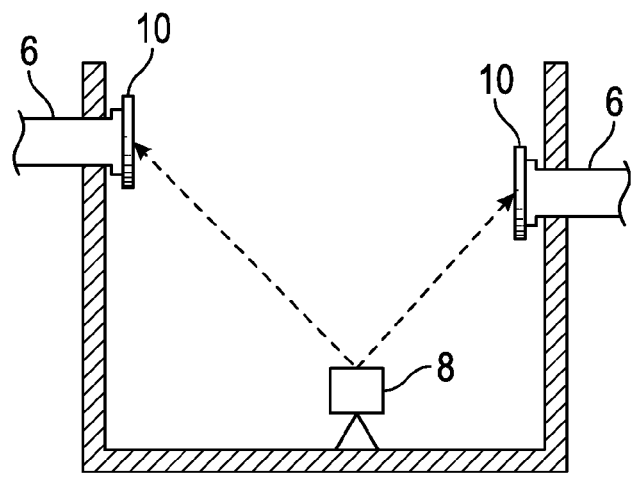
FIG. 1 is a schematic side view of an example placement of a centering tool used in combination with a laser surveying device.

For example, FIG. 1 shows a schematic side view of an example placement of one or more centering tools 10 mounted on the ends of respective pipes 6 and used in combination with a laser surveying device 8 to determine the exact location of the center of each pipe flange within a room of a building. The laser surveying device 8 can be disposed at any convenient observation point within the room. The laser surveying device can be configured to receive reflected light from any centering tool 10 disposed in the area. For continuity, the same reference numbers and symbols are sometimes used throughout this disclosure, though multiple embodiments will be disclosed. Any dimensions and/or measurements provided in the figures is exemplary and the present disclosure is not limited to such dimensions and/or measurements.

Figure 2:
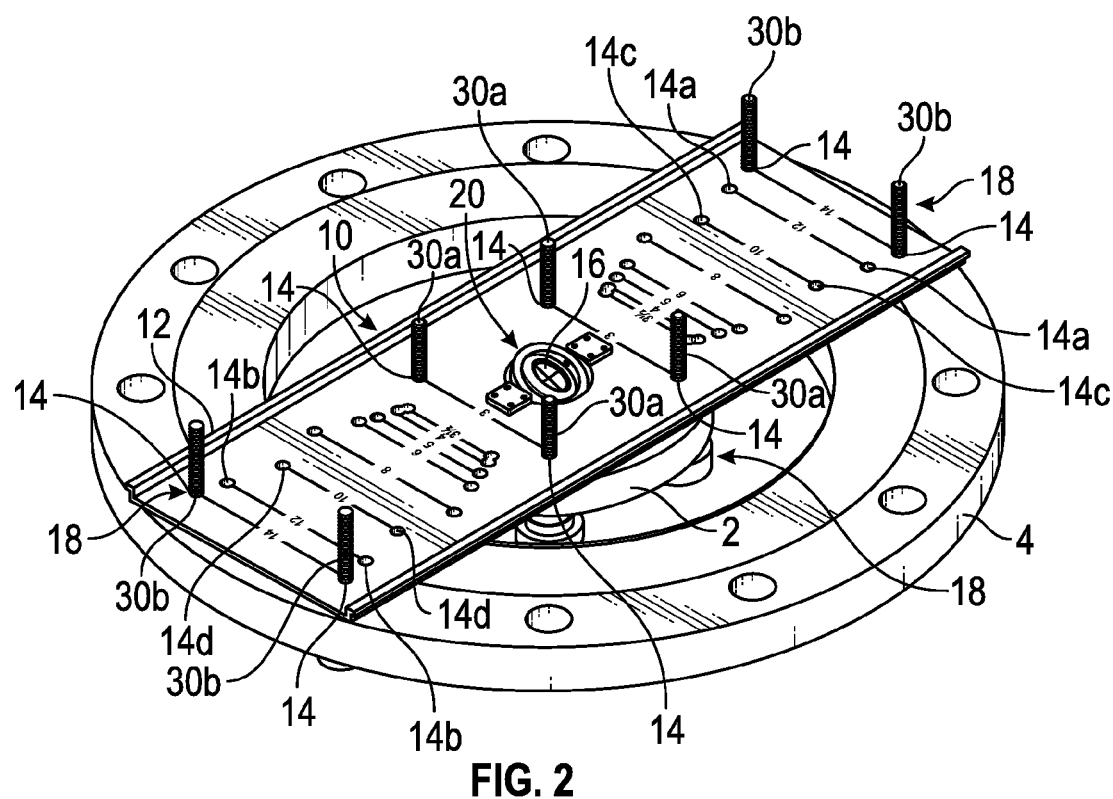
FIG. 2 is a perspective view of an embodiment of a centering tool attached to a large pipe flange and a small pipe flange.

An embodiment of the centering tool 10 is illustrated in FIG. 2. The centering tool 10 can be adapted to be removably mounted on a plurality of differently sized pipe flanges. The centering tool 10 can comprise a bracket member 12. The bracket member 12 can comprise an elongate member that can be as long or longer than the diameter of a flange to which the bracket member 12 can be removably attached.

The bracket member 12 can be configured to be removably mounted to the flange of a pipe. The bracket member 12 can include a plurality of sets of openings 14 across the length of the bracket member 12 that can be adapted to be aligned with the bolt openings on opposing sides of various sizes pipe flanges. At the center of the bracket member 12 can be a reflector 16, discussed in further detail below.

In the illustrated embodiment, each set of openings 14 includes four openings 14, namely, two openings 14 on each side of the bracket member 12 and equidistant from the reflector 16 and/or center point of the bracket member 12. In other words, each set of openings 14 can include two openings, e.g., 14a and 14a on one side of the bracket member 12 (the right side in FIG. 2) and two openings, e.g., 14b and 14b on the other side of the bracket member 12 (the left side in FIG. 2). In another example from FIG. 2, a set can include openings 14c and 14c on one side of the bracket member 12 (on the right side) and 14d and 14d on the other side of the bracket member 12 (on the left side). The distance between the two adjacent openings (e.g., the distance between 14a and 14a) in each set on either side of the bracket member can be the same for each set of openings 14 or can vary depending on the sizes of the pipe flanges intended to be used with the bracket member 12. Other embodiments can include sets of openings 14 having greater or fewer than four openings 14 in each set. For example, some embodiments of the centering tool 10 can include one or more sets of openings 14 having two openings 14, one opening 14 on each side of the bracket member 12 and equidistant from the reflector 16 and/or center point of the bracket member 12. The openings 14 can all be the same size or can vary in size depending on the sizes of the pipe flanges intended to be used with the bracket member. In the illustrated example, the bracket member 12 is formed with nine sets of openings 14 (with four openings 14 in each set) for mounting on nine different sizes of pipe flanges. The sets of openings may be situated at different distances from the reflector 16 and/or center point of bracket member 12. As illustrated, the nine sets of openings in FIG. 2 are shown as 3, 3½, 4, 5, 6, 8, 10, 12, and 14 units from the center of bracket member 12, respectively.

FIG. 2 shows a relatively smaller pipe flange 2 positioned inside a relatively larger pipe flange 4 for purposes of illustration. In some embodiments, the centering tool 10 can be removably attached to a pipe flange of a range of different size pipe flanges using one or more fasteners 18. For example, when mounted on a relatively smaller diameter pipe flange 2, shafts 30*a* of fasteners 18 can be inserted through the openings in the pipe flange 2 and the radial innermost openings 14 in the bracket member 12 (the openings closest to the middle of the bracket member 12, as shown in FIG. 2). When mounted on a relatively larger diameter pipe flange 4, shafts 30*b* of fasteners 18 can be inserted through the openings in the pipe flange 4 and the radial outermost openings 14 in the bracket member 12 (the openings closest to the ends of the bracket member 12, as shown in FIG. 2). For purposes of illustration, FIG. 2 shows the bracket member 12 mounted on the smaller pipe flange 2 and the larger pipe flange 4, while in practice the bracket member would typically be mounted on one pipe flange at a time.

Figure 3:
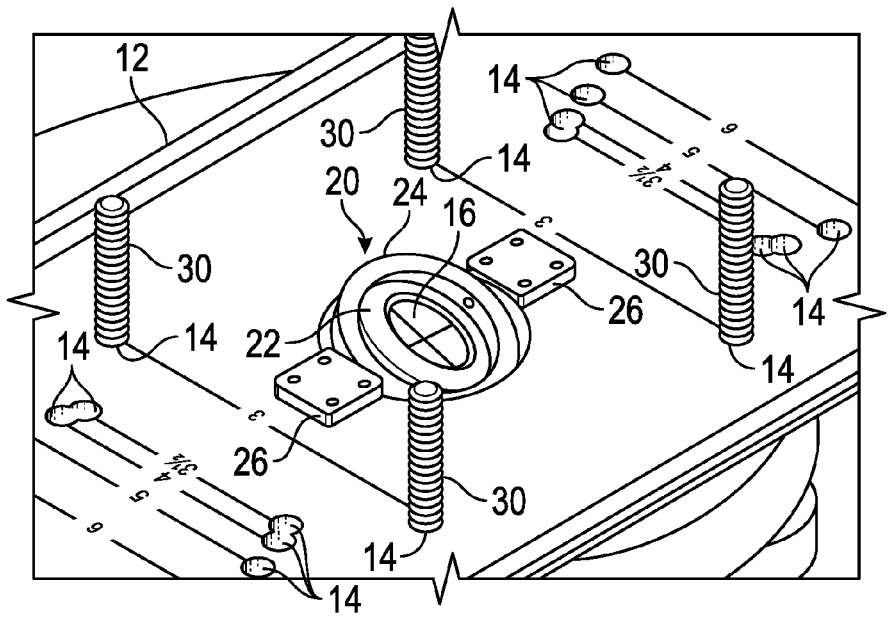
FIG. 3 is a perspective partial view of the centering tool of FIG. 2, showing a reflector and a reflector mount.

As shown in FIGS. 2-3, the reflector 16 can be mounted on a reflector mount 20 that can be at the center of the bracket member 12. Additionally and/or alternatively, the reflector mount 20 can be located at the center point of each set of openings 14. The reflector mount 20 can allow the tilt of the reflector 16 to be adjusted relative to the bracket member 12 with respect to two perpendicular axes.

In use, the tool 10 can be mounted to the flange of a pipe 6, as shown in FIG. 1. The theodolite 8 can be placed at a known location, also referred to as an observation point, within a room. A laser from the theodolite can be aimed at the reflector 16. The theodolite can record the distance from the theodolite to the center of the pipe flange (or the center of the pipe at its end if the pipe doesn't have a flange). This process can be repeated for each pipe flange in the room. The same centering tool 10 can be installed and subsequently removed from each pipe flange for each measurement. If desired, a separate centering tool 10 can be mounted on each pipe flange. The locations of the centers of the pipe flanges can then be used to determine the locations of the pipe flanges relative to each other. The data recorded from the theodolite can be downloaded or transferred to a CAD program, which can be used to generate a drawing with the precise locations of each pipe flange within the room and the precise distances between pipe flanges. A contractor can then use this information to accurately cut and install additional pipes that extend between the pipe flanges.

Figure 4:
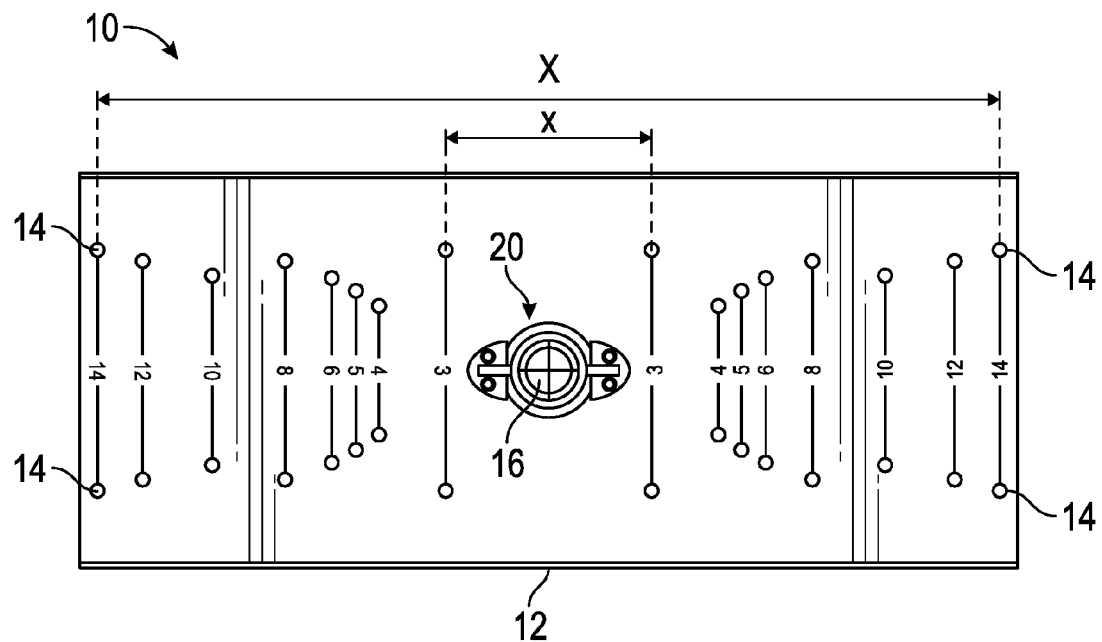
FIG. 4 is a plan view of an exemplary centering tool.

FIG. 4 is a top plan view of an embodiment of a centering tool 10 adapted to be removably mounted on a plurality of differently sized pipe flanges. The centering tool 10 includes sets of openings 14, each set including a pair of openings 14 on either side of a reflector 16 in a gimbal type reflector mount 20. The centering tool 10 is similar to the centering shown in FIG. 2, except that the embodiment of FIG. 4 has eight sets of four openings 14. The distance X between pairs of openings 14 at equidistant locations on opposites of the reflector can vary depending on the sizes of pipe flanges intended to be used with the centering tool 10.

Figure 5:
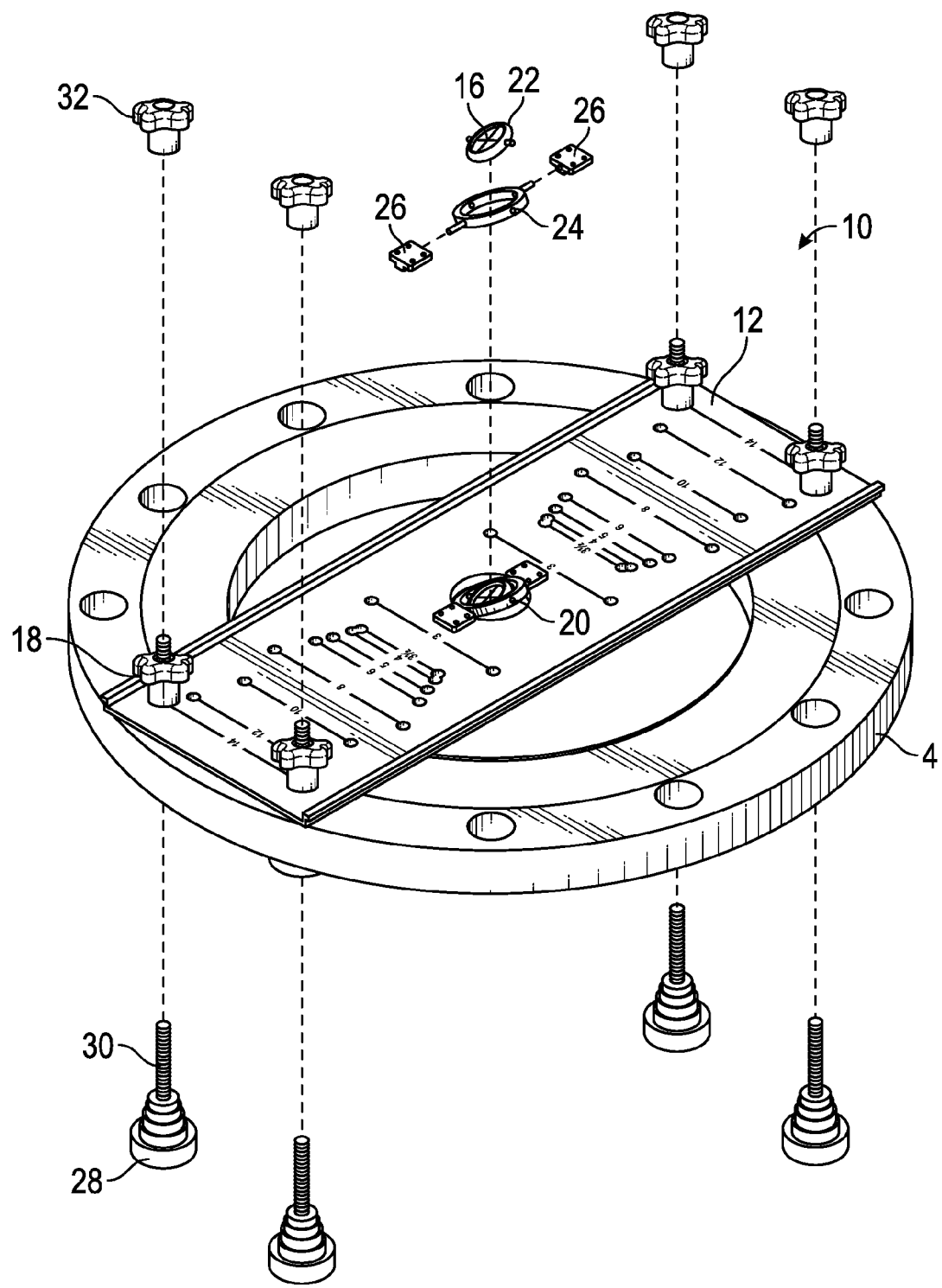
FIG. 5 is a perspective view of an exemplary centering tool attached to a flange, including a disassembled view of a fastener and an exploded view of a reflective gimbal.
Figure 6:
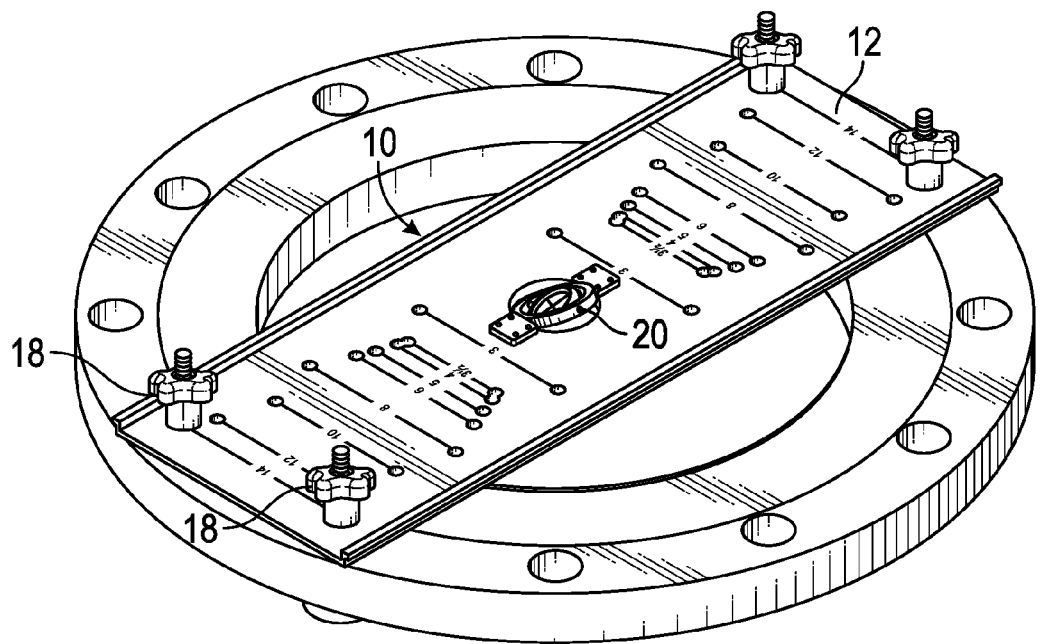
FIG. 6 is a perspective view of the exemplary centering tool of FIG. 5, assembled.
Figure 7:
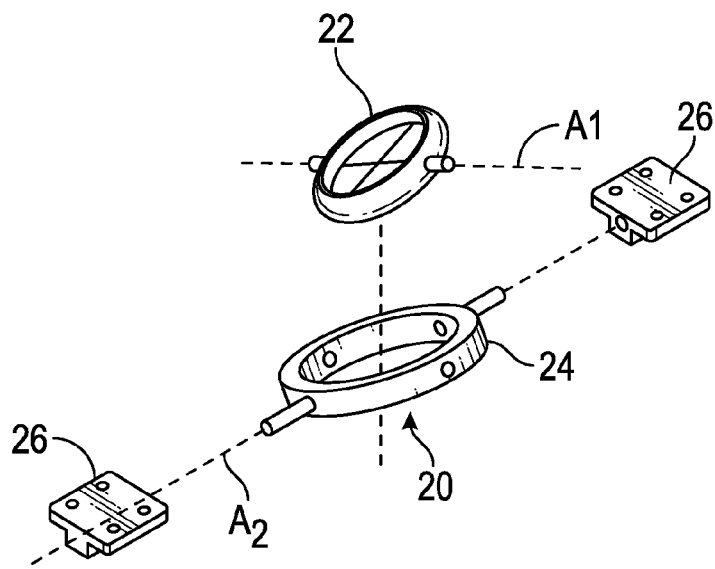
FIG. 7 is the exploded view of the reflective gimbal of FIG. 5.
Figure 8C:
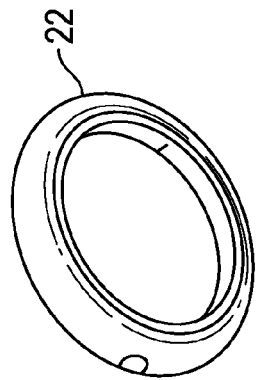
FIGS. 8a-c show various views of a first ring of a reflector gimbal.
Figure 9C:
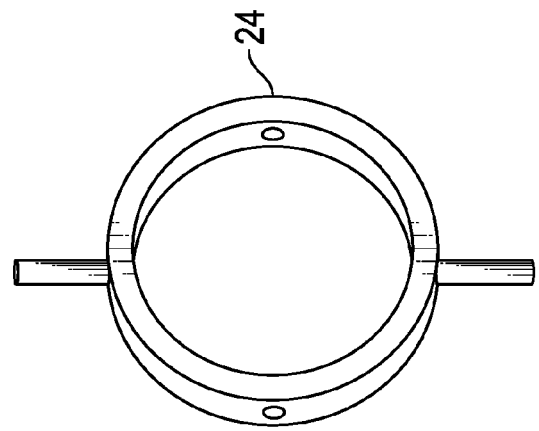
FIGS. 9a-c show various views of a second ring of a reflector gimbal.
Figure 8B:
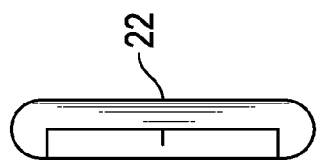
Figure 9B:
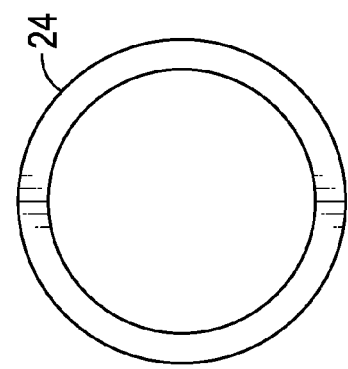
Figure 8A:
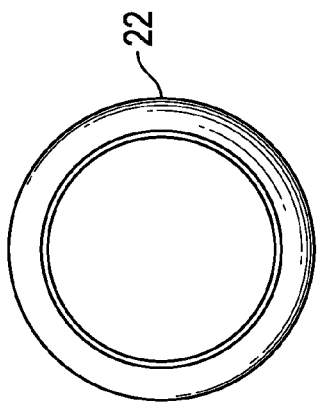
Figure 9A:
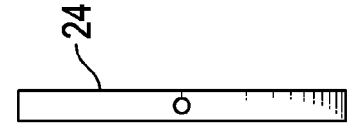

FIG. 5 shows a perspective view of the centering tool 10 removably mounted to a flange 4. FIG. 5 further shows an embodiment of the reflector mount 20 in an exploded view and an embodiment of the fasteners 18 in a disassembled view. As shown in FIGS. 7-10, the reflector mount 20 can include a gimbal structure having a first ring 22 configured to be rotatably mounted along a first axis $A_1$ in a second ring 24. The second ring 24 can be configured to be rotatably mounted along a second axis $A_2$ to the bracket member 12, for example via one or more gimbal members 26, fixed on the bracket member 12 and configured to rotatably mount the second ring 24 to the bracket member 12. The reflector 16 can be located within the first ring 22. The reflector 16 can comprise any material, such as a mirror, adapted to reflect a light, such as a laser beam, from a theodolite or other surveying device.

FIG. 5 further shows an embodiment of the fasteners 18 in an assembled and disassembled view and FIG. 11 is a side perspective picture of a fastener 18. The fasteners 18 can include a head 28 and a shaft or bolt 30. The shaft 30 can be threaded for removable mounting of a nut 32. FIG. 12 is a cross-sectional view of the head 28 of the fastener 18. The fastener 18 can be adapted to be removably mounted on a plurality of differently sized pipe flanges and/or a plurality of differently sized flange holes. For example, the head 28 can taper from a base width to an end width, the end width being less than the base width. The head 28 can taper in a stepped manner. In the embodiment shown in FIGS. 11-12, the head 28 includes a base 34 and a plurality of stepped portions 36*a*-36*d* (four in the illustrated embodiment) that decrease in diameter from the first stepped portion 36*a* to the fourth stepped portion 36*d*. Each of the four stepped can be sized to be inserted into a differently sized pipe flange hole. In this manner, the stepped portion that fits into the openings of a particular flange will center and prevent lateral movement of the fastener with respect to a flange opening, even though the bolt 30 may be substantially undersized relative to the flange opening. As shown in FIG. 12, the head 28 can further include a bore 38 that can extend through at least a portion of the head 28 and can be configured to receive at least a portion of the shaft 30.

Figure 13:
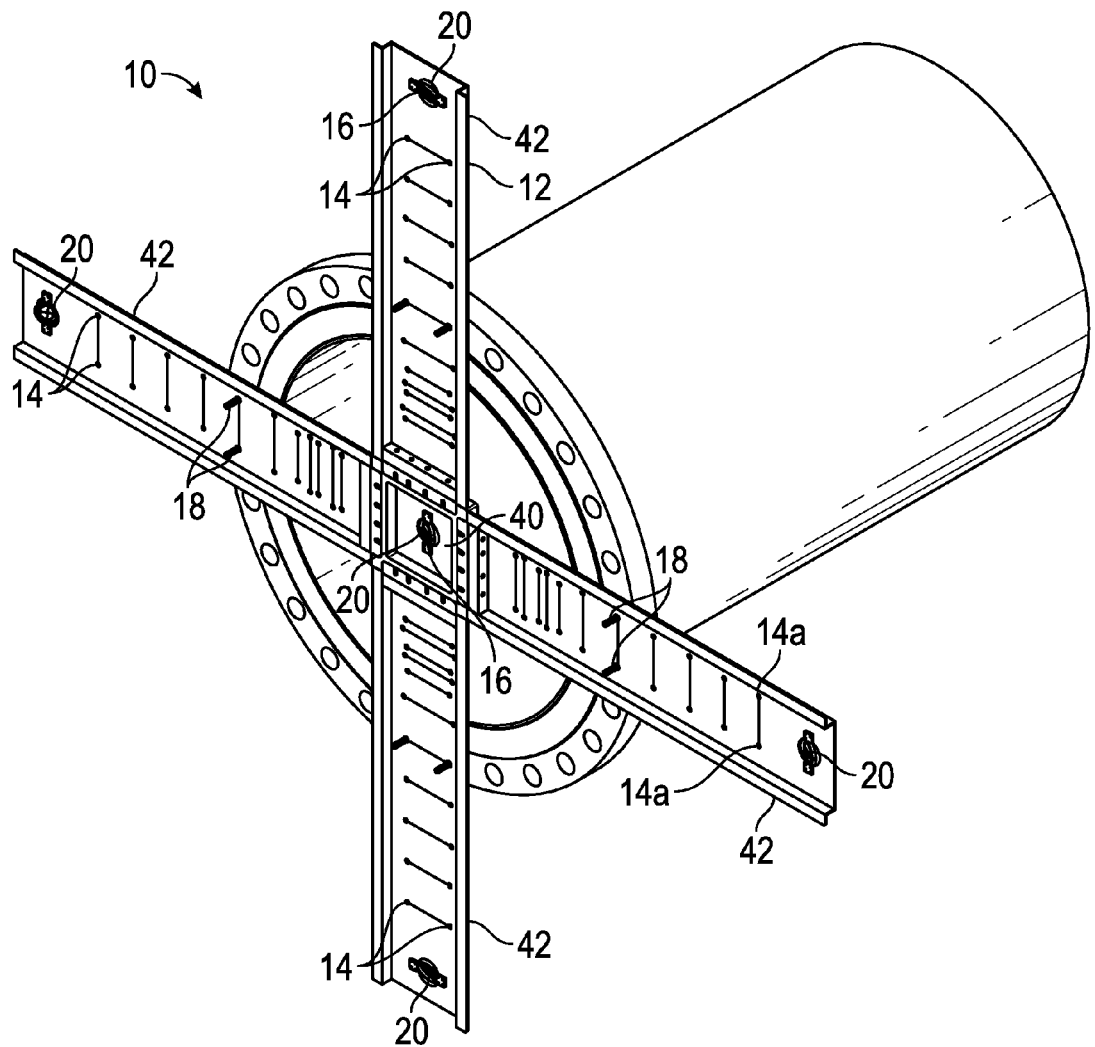
FIG. 13 is a perspective view of an alternative embodiment of a centering tool removably attached to a pipe flange.
Figure 14:
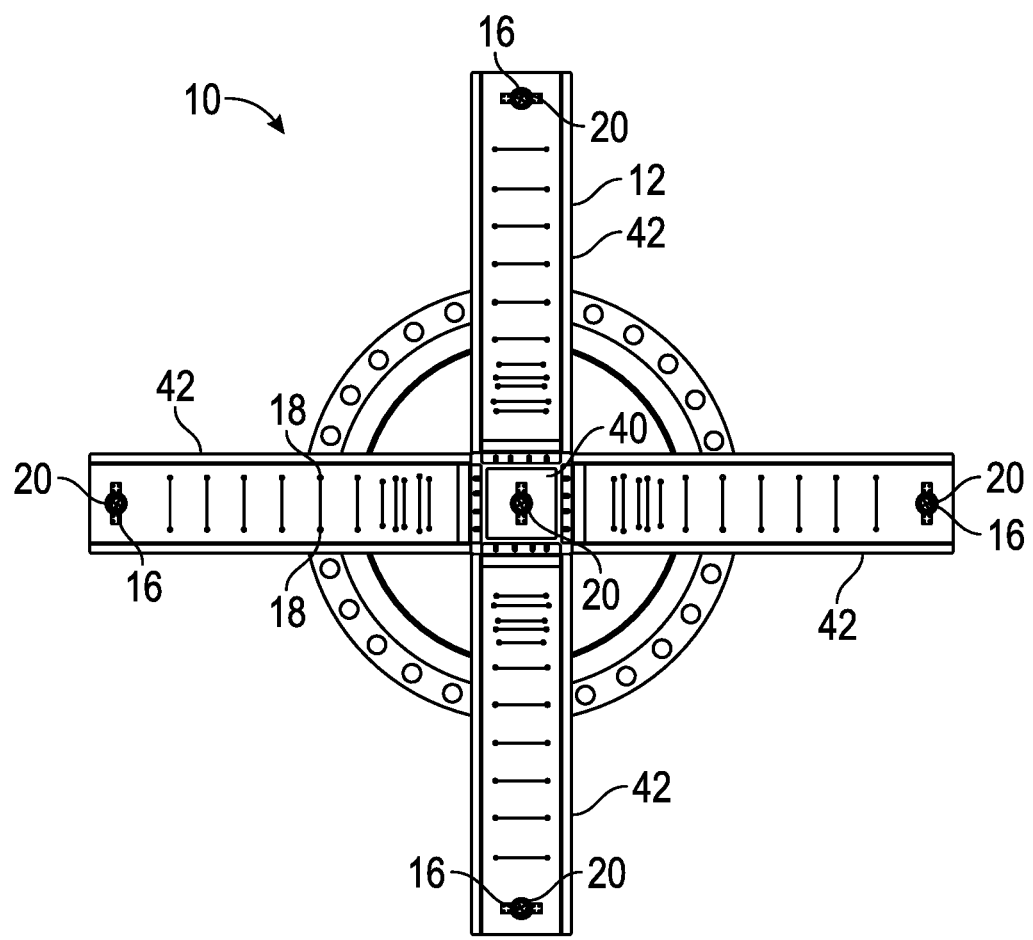
FIG. 14 is a plan view of the centering tool of FIG. 13.
Figure 15:
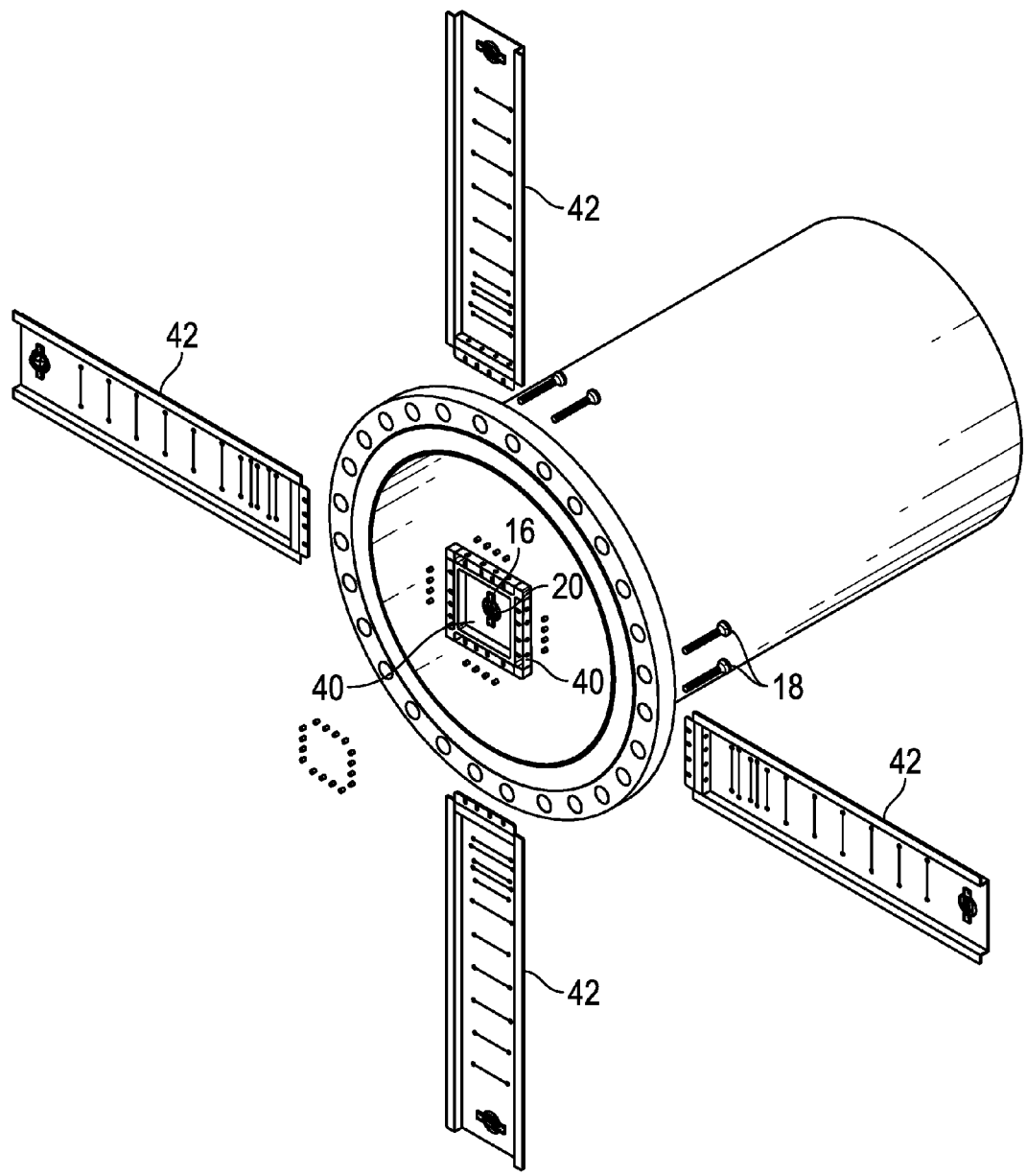
FIG. 15 is an exploded view of the centering tool of FIG. 13.

FIGS. 13-15 show another embodiment of a centering tool 10 adapted to be removably mounted on a plurality of differently sized pipe flanges in accordance with the present disclosure. The centering tool 10 can include a bracket member 12 having a four-armed star shape, each arm 42 being equidistant from an adjacent arm 42. The bracket member 12 can include a four sided base 40, each side having an arm extending therefrom. Each arm 42 can be the same length. Alternatively, a first pair of opposing arms 42 can have a first length and a second pair of opposing arms 42 can have a second length.

Each pair of arms 42 can be configured to be removably mounted to opposing sides of flanges of varying sizes. For example, the pairs of arms 42 can include a series of sets of openings 14 running the length of the arms, similar to the openings 14 described with reference to FIG. 2.

The arms 42 can be fixed to the base 40 or can be removably mounted to the base 40. The base 40 can be at the center of the arms 42. Additionally, the base 40 can include a reflector 16 mounted in a reflector mount 20. The reflector 16 can be at the center point of each pair of arms 42. The reflector mount 20 can be similar to the reflector mount 20 described with reference to FIGS. 5-10.

Additionally and/or alternatively, each arm 42 can include one or more reflectors 16 and reflector mounts 20. The reflectors 16 and the reflector mounts 20 can be near the ends of the arms 42, distal to the base and/or beyond the last set of openings 14. Alternatively, the reflectors 16 and reflector mounts 20 can be disposed between pairs of openings (e.g., 14a and 14a) in each set of openings 14. The reflector mount 20 can be similar to the reflector mount 20 described with reference to FIGS. 5-10.

Figure 16:
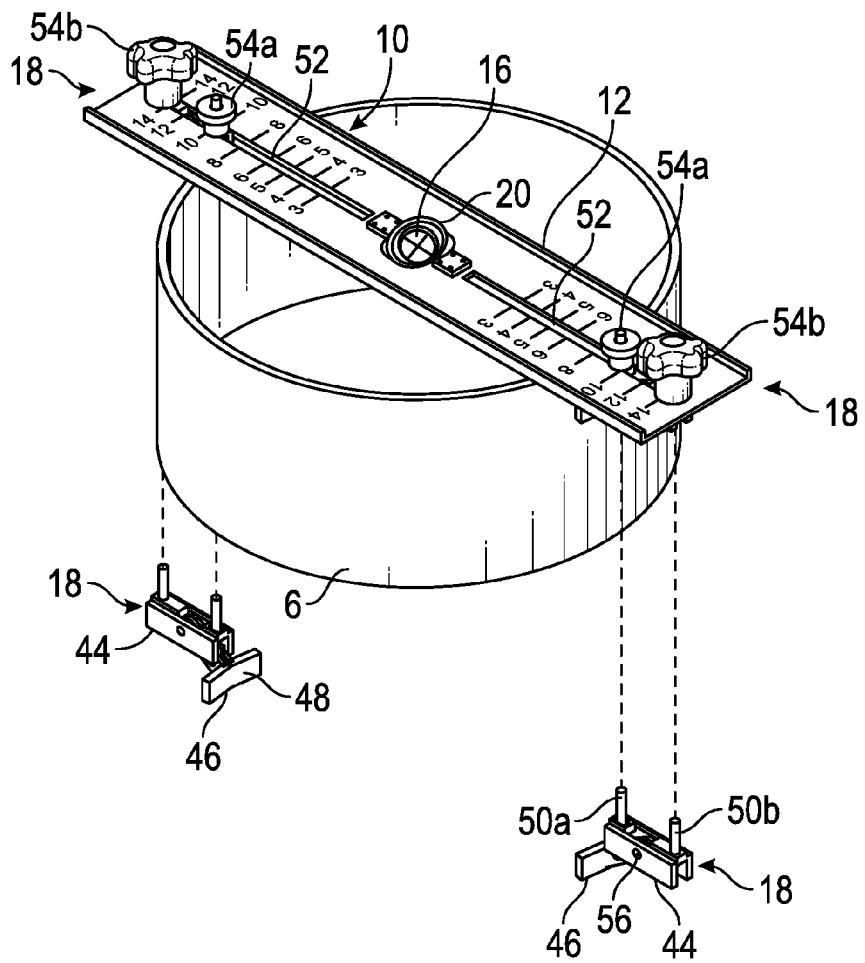
FIG. 16 is a perspective view of an alternative embodiment of a centering tool, showing an alternative embodiment of a fastener, shown partially disassembled.
Figure 17:
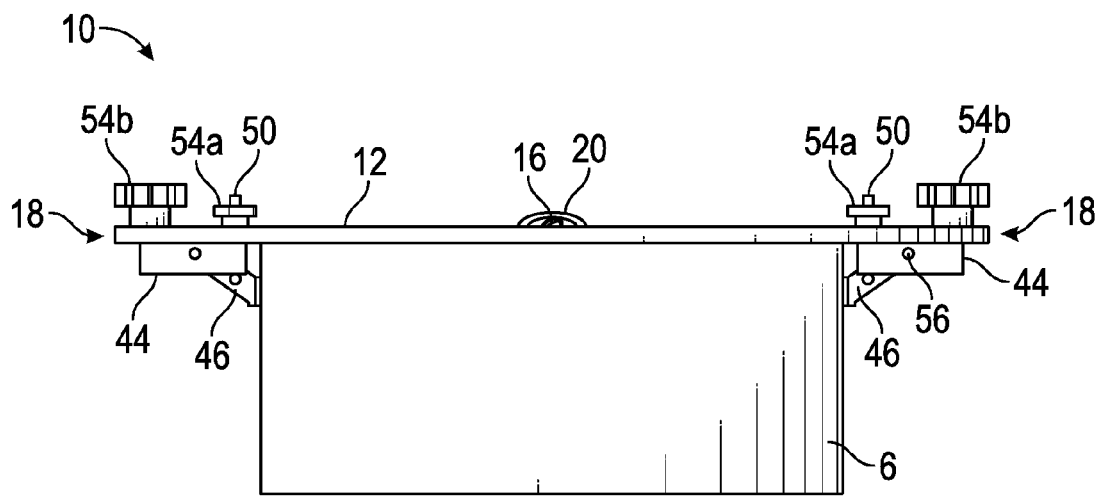
FIG. 17 is a side view of the centering tool of FIG. 16, showing an assembled fastener.
Figure 18:
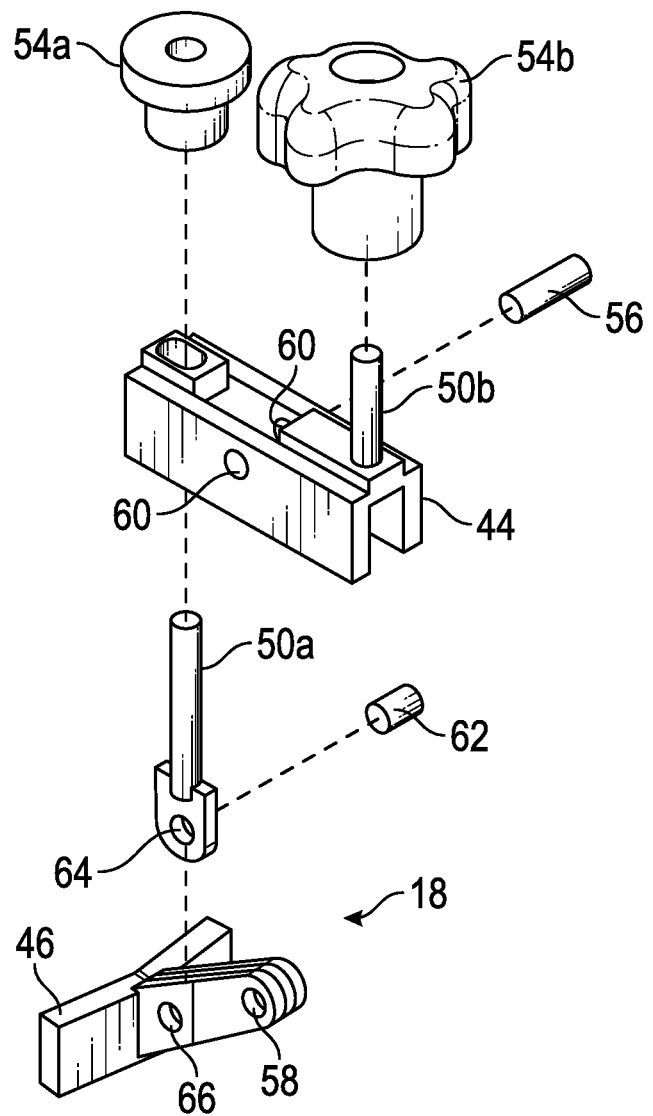
FIG. 18 is an exploded view of the fastener in FIG. 16.

FIGS. 16-18 show another embodiment of a centering tool 10 adapted to be removably mounted on a plurality of differently sized pipes in accordance with the present disclosure. The centering tool in this embodiment is configured to be mounted on pipes that do not have flanges. The centering tool 10 can include a bracket member 12. The bracket member 12 can have an elongate shape. The bracket member 12 can include an elongate flat shape having flanges extending from the sides of the bracket member 12. The bracket member 12 can further include a reflector 16 and a reflector mount 20. The reflector 16 and reflector mount 20 can be attached to the bracket member 12 in a similar manner as described above with reference to FIGS. 5-10.

The bracket member 12 can include two elongate slots 52 extending through the center of the width of the bracket member 12. The two elongate slots 52 can extend from approximately an area adjacent the reflector mount 20 to an area adjacent the distal ends of the bracket member 12.

Fasteners 18, also referred to as pipe clamps in this embodiment, can be used to removably mount the bracket member 12 to pipes of varying sizes. The fasteners 18 can include an elongate bar member 44 and abutment piece 46. The abutment piece 46 can extend from a bottom of the elongate bar member 44 and can include a concave surface 48 configured to abut the side of the pipe. The concave surface 48 can be substantially flush with the end of the elongate bar member 44. The elongate bar member 44 can include two rods or bolts 50a, 50b extending from a top surface of the elongate bar member 44. The two rods 50a, 50b can be threaded and can include a width adapted to slide along the length of the elongate slots 52. The fastener 18 can further include one or more nuts 54a, 54b configured to engage the two rods.

As best shown in FIG. 18, the abutment piece 46 can be pivotally mounted to the bar member 44, such as with a pivot pin 56 extending through an opening 58 in the abutment piece 46 and corresponding openings 60 in the bar member 44. The lower end of the bolt 50a can be pivotally connected to the abutment piece 46, such as with a pin 62 that can extend through an opening 64 in the bolt 50a and an opening 66 in the abutment piece 46.

In use, two fasteners 18 can be positioned such that the inner surface 48 of the abutment pieces 46 abuts the outer surface of a pipe on diametrically opposed sides of the pipe 6. The bolts 50a, 50b can be inserted into the slots 52 at any location along their length and slid within the slots to adjust the position of the fasteners to the size of the pipe. The nuts 54b are then tightened on the bolts 50b to maintain the position of the fasteners 18 relative to the bracket member 12 and the pipe. The nuts 54a are then tightened onto the bolts 50a, which in turn urges the abutment pieces laterally against the outer surface of the pipe, effectively clamping the pipe between the fasteners 18.

Figure 19:
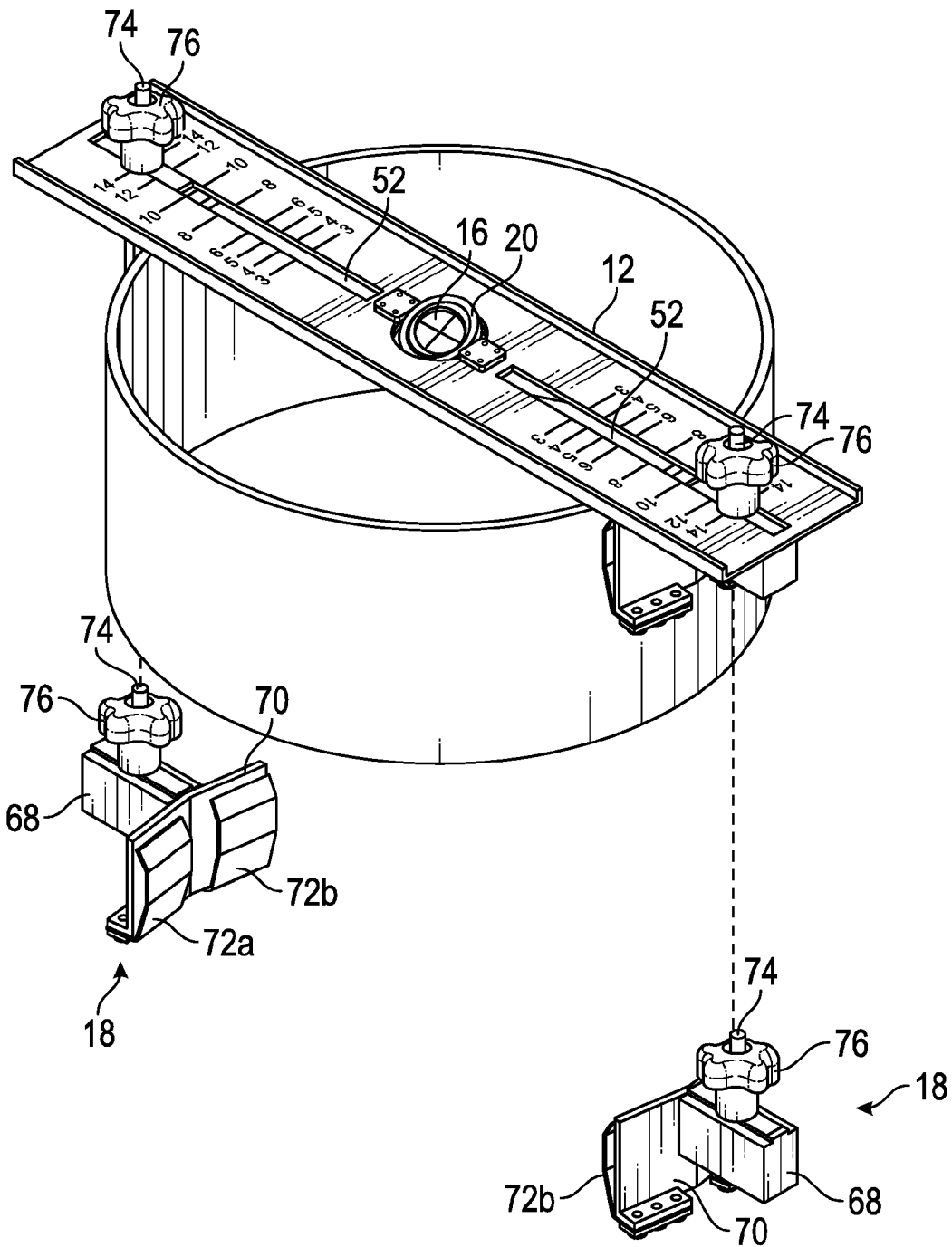
FIG. 19 is a perspective view of another alternative embodiment of a centering tool, showing another alternative embodiment of a fastener.
Figure 20:
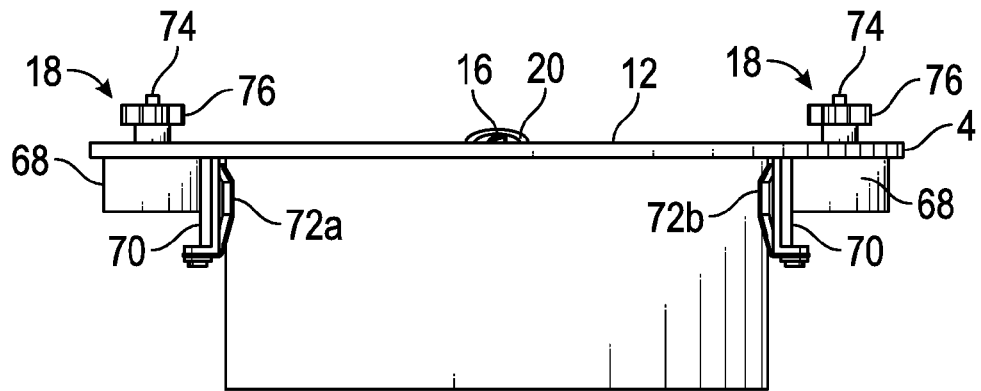
FIG. 20 is a side view of the centering tool of FIG. 19, showing an assembled fastener.
Figure 21:
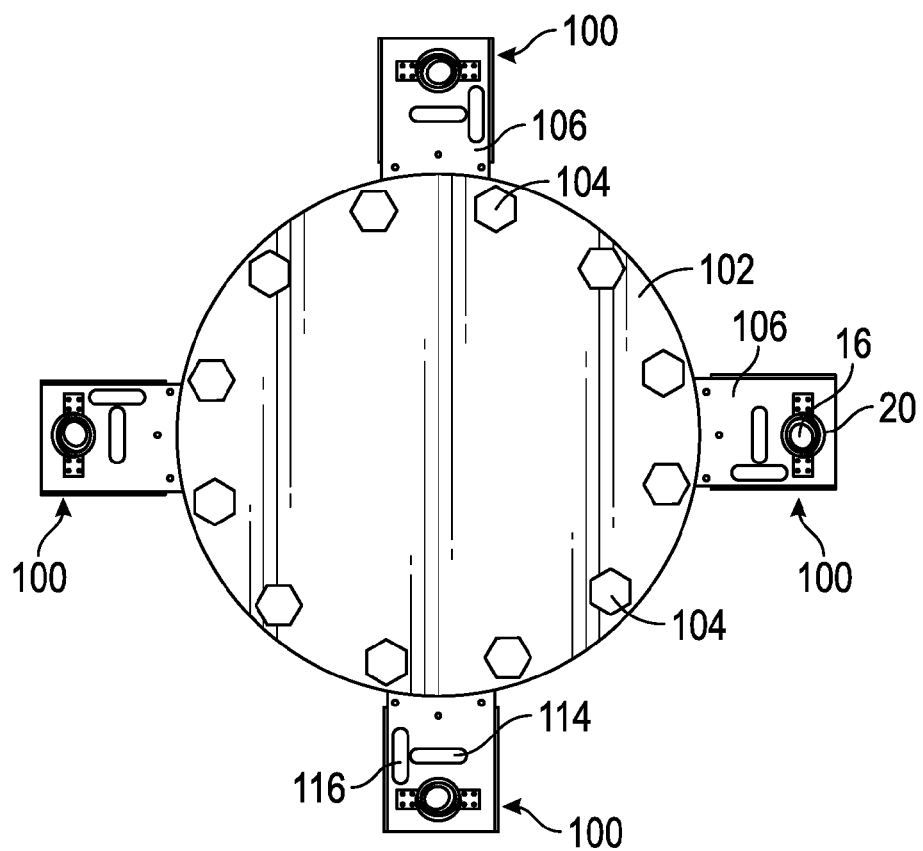
FIG. 21 is a plan view of an assembly comprising a plurality of target devices mounted around the outside edge of a pipe flange, which is secured to a blind flange.

FIGS. 19-20 show another embodiment of a centering tool 10 adapted to be removably mounted on a plurality of differently sized pipes in accordance with the present disclosure. The centering tool 10 can include a bracket member 12 such as described in FIGS. 16-18.

Fasteners 18, also referred to as pipe clamps, can be used to removably mount the bracket member 12 to pipes of varying sizes. The fasteners 18 can each include an elongate bar member or support member 68 and a mounting foot 70, which can further comprise first and second abutment pads 72a, 72b configured to abut the side of the pipe. The mounting foot 70 can be positioned at the end of the support member 68. The support member 68 can include a rod 74 extending from a top surface of the support member 68. The rod 74 can be threaded and can include a width adapted to slide along the length of the elongate slots 52. The fastener 18 can further include a nut 76 configured to engage the rod.

In use, as best shown in FIG. 20, fasteners 18 can be positioned by sliding them along the elongate slots 52 (not pictured) such that the abutment pads 72a, 72b on the mounting foot 70 abut the outer surface of a pipe on diametrically opposed sides of the pipe. The nuts 76 are then tightened on the bolts 74 to maintain the position of the fasteners 18 relative to the bracket member 12 and the pipe, and to removably secure the bracket member 12 to the pipe via the opposed pairs of abutment pads 72a, 72b of the opposed mounting feet 70.

FIGS. 21-24 show an embodiment of an assembly comprising a plurality of target devices 100 that are adapted to be removably mounted at multiple locations around the outer, curved side surface 150 of a pipe flange. Such an embodiment can be particularly useful where a blind flange, or end cap, 102 or other cover is already mounted onto the pipe flange 4 and the openings of the flange are occupied by bolts 104 connecting the cover to the pipe flange 4, or in other situations where it is not possible or impractical to mount a target device to the front of a pipe flange using the existing openings of the pipe flange. The target devices 100 collectively provide a centering tool assembly that permits a user to determine the location of the center of a pipe.

Each target device 100 can comprise a reflector 16, which can be mounted to a bracket member 106 using a reflector mount 20. While in the illustrated embodiment, four target devices 100 are shown, as few as two target devices 100 can be mounted on diametrically opposing sides of the pipe flange, or more than four target devices 100 can be mounted at equally spaced locations around a pipe flange in order to allow determination of the center of the pipe using the methods previously described. For example, a theodolite 8 can be placed at a known location as previously described, and a laser aimed at a first reflector 16 of a first target device 100. The theodolite can record the distance from the theodolite to the first reflector. This process can be repeated for each reflector surrounding a given pipe flange. The data recorded from the theodolite can be downloaded to a CAD program, which can use the measured distances from the theodolite to the reflectors surrounding a given pipe flange. The locations of these reflectors can then be used to determine the location of the center of the pipe. Once this location is determined, this information can be further used in the same manner as described above with regard to FIGS. 1-3.

Figure 22:
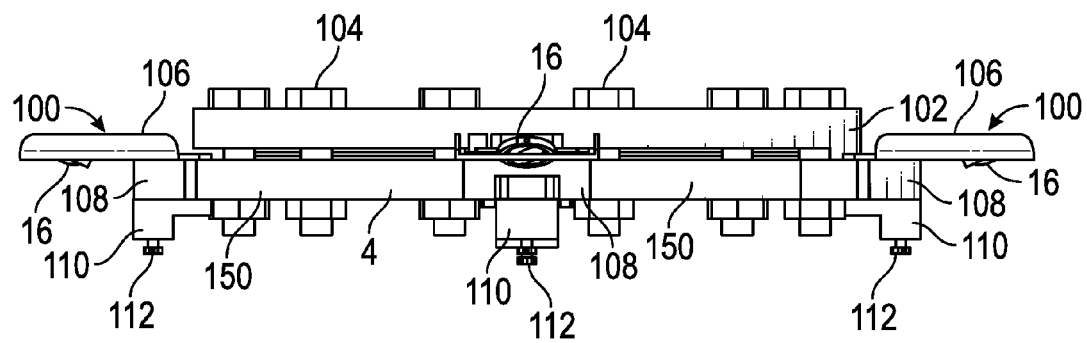
FIG. 22 is a side view of the embodiment of FIG. 21, showing the plurality of target devices attached around the outside edge of the pipe flange, which is secured to the blind flange.

As illustrated in FIG. 22, each bracket member 106 can be further secured to an abutment member 108, and a clamping member 110, using a clamping fastener, such as a screw 112. In use, the bracket member 106 and the clamping member 110 are positioned on opposite sides of the outer edge portion of the pipe flange 4. When tightened, the screw 112 can force the bracket member 106 and the clamping member 110 toward one another, effectively clamping both the pipe flange 4 and the abutment member 108 between the bracket member 106 and the clamping member 110, while permitting the abutment member 108 to rest against the outer, curved surface of the pipe flange 150.

Figure 23:
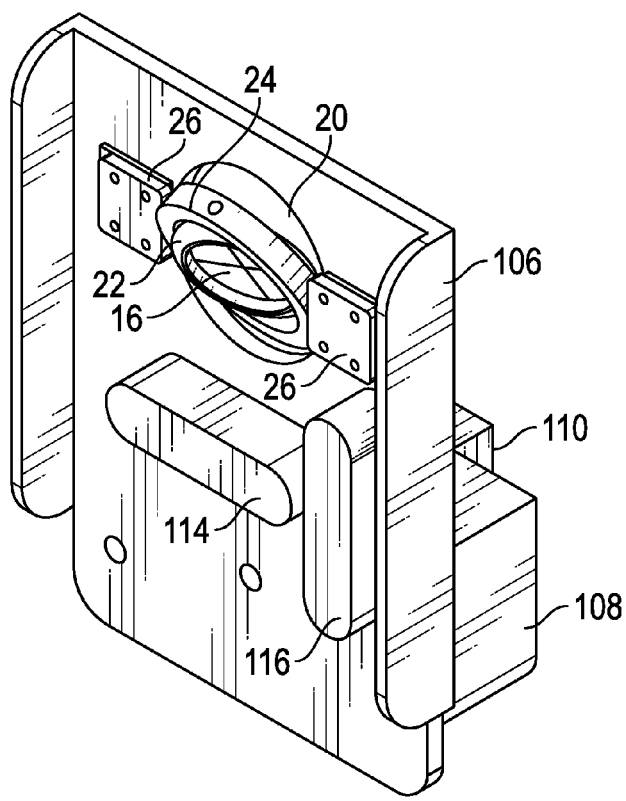
FIG. 23 is a perspective view of one of the target devices of FIG. 21.

As illustrated in FIG. 23, the bracket member 106 can comprise an elongate flat plate having flanges extending from the sides of the bracket member 106. The bracket member 106 can further include a reflector mount 20 and a reflector 16 mounted on the reflector mount 20. The reflector 16 and reflector mount 20 can be attached to the bracket member 106 in a similar manner as described above with reference to FIGS. 5-10. The bracket member 106 can further include a horizontal level 114 and a vertical level 116 (e.g., bubble levels), which in operation can be utilized to ensure that the bracket member 106 is properly positioned relative to the flange.

Figure 24:
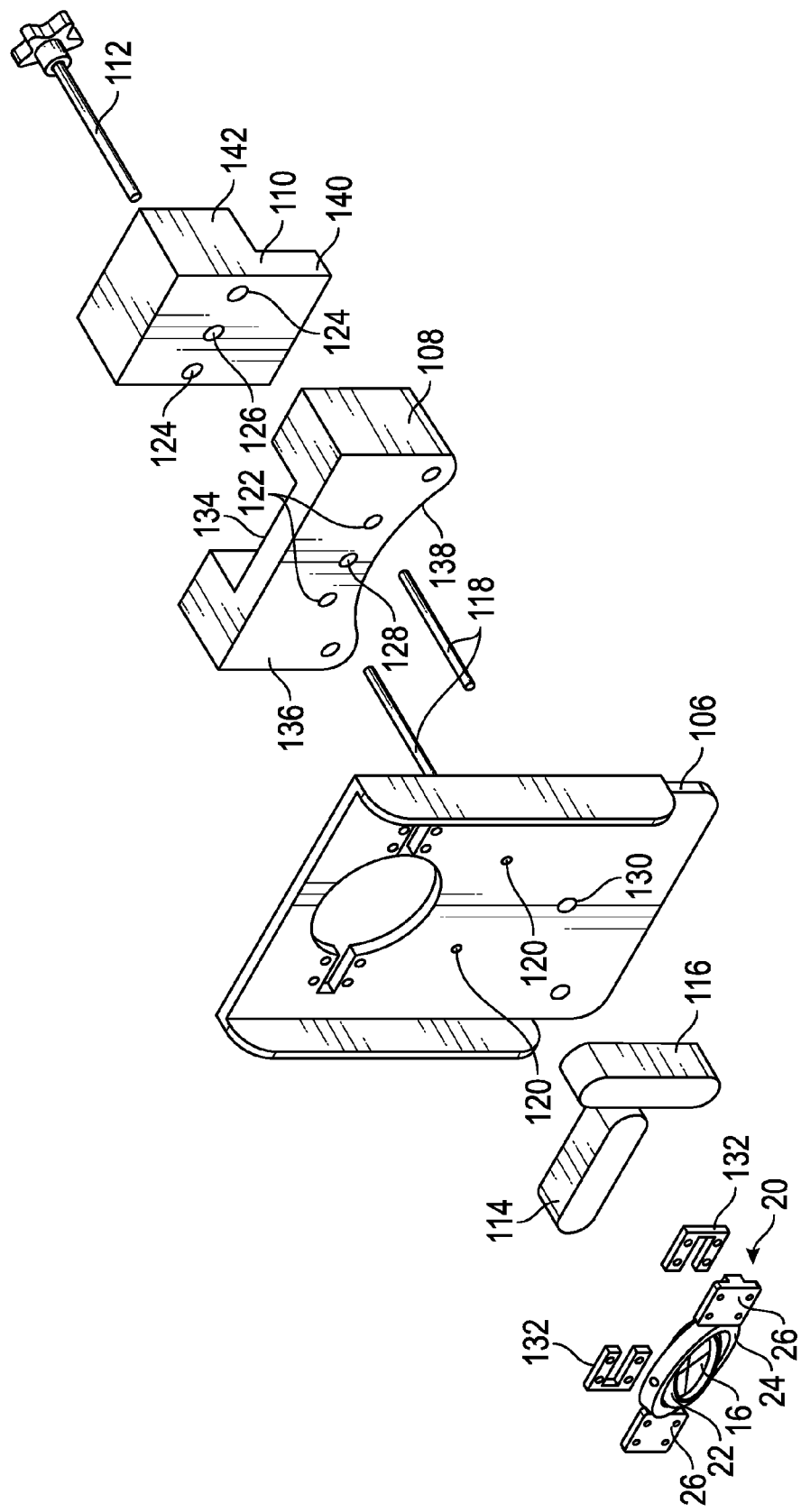
FIG. 24 is an exploded view of one of the target devices of FIG. 21.

As illustrated in FIG. 24, the bracket member 106 can further include alignment pins 118 that can extend through (or thread into) openings 120 in the bracket member 106, in turn through openings 122 in the abutment member 108 and finally though (or threaded into) openings 124 in the clamping member 110. Additionally, the screw 112 can extend through an opening 126 in the clamping member 110, in turn through an opening 128 in the abutment member 108, and finally through (or threaded into) an opening 130 in bracket member 106. And, bracket member 106 can further include gimbal spacers 132, which in one embodiment can be 1/16 inch spacers that are positioned between the bracket member 106 and the gimbal members 26.

The abutment member 108 can, in particular embodiments, be a substantially U-shaped elongate body, configured with a recess 134 in a lower surface within which clamping member 110 can be secured. The abutment member 108 can further include a planar upper surface 136 that makes contact with the bracket member 106 when the screw 112 is tightened. The abutment member 108 can further include a concave front surface 138, which may be substantially curved or rounded in shape to correspond with and seat against the outer surface 150 of the pipe flange 4 when the screw 112 is tightened. Further, due to its concave, rounded shape, the concave front surface 138 can seat against flanges of varying sizes.

The clamping member 110 can, in particular embodiments, be a substantially rectangular body, which, at one end, includes a flange 140 that extends out from a lower body portion 142. The flange 140 forms a "lip" which is used to clamp to the back of a pipe flange 4, so that when secured using the screw 112, the pipe flange is secured between the lip 140 and the bracket member 106.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, can be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially can in some cases be rearranged or performed concurrently. Moreover, for the sake of simplicity, the attached figures cannot show the various ways in which the disclosed methods can be used in conjunction with other methods. As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A", "B,", "C", "A and B", "A and C", "B and C", or "A, B, and C."

As used herein, the term "coupled" generally means physically coupled or linked and does not exclude the presence of intermediate elements between the coupled items absent specific contrary language.

In view of the many possible embodiments to which the principles of the disclosed invention can be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. An assembly comprising:
a plurality of target devices for removable attachment to at least a larger pipe flange having a first diameter and a smaller pipe flange having a second diameter, the second diameter being less than the first diameter, each target device comprising:
a bracket member configured to be positioned on one side of the smaller or larger pipe flange;
a reflector coupled to the bracket member;
a clamping member configured to be positioned on an opposite side of the smaller or larger pipe flange from the bracket member;
an abutment member positioned between the bracket member and the clamping member and configured to contact an outer side surface of the smaller or larger pipe flange; and
a fastener configured to retain the bracket member and the clamping member on opposite sides of the smaller or larger pipe flange.

2. The assembly of claim 1, further comprising one or more levels coupled to the bracket, wherein the one or more levels can be used to determine the proper positioning of the target device.

3. The assembly of claim 1, wherein the fastener comprises a bolt that extends through the bracket member, the abutment member, and the clamping member; and
   wherein the fastener, when tightened, clamps the bracket member and the clamping member on opposite sides of the pipe flange.

4. The assembly of claim 1, further comprising one or more alignment pins extending through corresponding openings in the bracket member, the clamping member and the abutment member.

5. The assembly of claim 1, wherein the abutment member includes a concave rounded surface shaped to correspond with and seat against the outer side surface of the pipe flange.

6. The assembly of claim 1, in combination with the pipe flange, and wherein the plurality of target devices comprises first and second target devices mounted on the pipe flange at diametrically opposed locations.

\* \* \* \* \*